US006734218B2

(12) United States Patent
Koshiba

(10) Patent No.: US 6,734,218 B2
(45) Date of Patent: May 11, 2004

(54) PROCESS FOR PRODUCING FOAMED RUBBER

(75) Inventor: Junichi Koshiba, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/233,509

(22) Filed: Sep. 4, 2002

(65) Prior Publication Data

US 2003/0114545 A1 Jun. 19, 2003

(30) Foreign Application Priority Data

Sep. 12, 2001 (JP) ........................................ 2001-276183
Feb. 25, 2002 (JP) ........................................ 2002-047708

(51) Int. Cl.⁷ ................................................. C08J 9/00
(52) U.S. Cl. ........................ 521/144; 521/143; 521/150
(58) Field of Search ........................ 521/95, 150, 144, 521/143, 134

(56) References Cited

U.S. PATENT DOCUMENTS 6,132,847 A    10/2000   Okita et al.

FOREIGN PATENT DOCUMENTS

JP          11-193335 A    7/1999

*Primary Examiner*—Morton Foelak
(74) *Attorney, Agent, or Firm*—Sughrue Mion, PLLC

(57) ABSTRACT

There are provided:
(i) a process for producing a foamed rubber having a density of less than 0.50 g/cm³, which comprises the step of foaming and cross-linking a rubber composition containing (i) an ethylene-α-olefin copolymer rubber, (ii) a vulcanizing agent and (iii) a foaming agent having a particle diameter of not more than 10 μm in terms of a median diameter, wherein an amount of the foaming agent exceeds 4.0 parts by weight per 100 parts by weight of the ethylene-α-olefin copolymer rubber, and
(ii) a sealing material for car use, which comprises the foamed rubber obtained by the above-mentioned process for producing a foamed rubber.

15 Claims, No Drawings

PROCESS FOR PRODUCING FOAMED RUBBER

FIELD OF THE INVENTION

The present invention relates to a process for producing a lightweight foamed rubber, which has superior compressive permanent strain, surface appearance and shape retaining property; a process for producing a lightweight foamed rubber; and a sealing material for car use comprising any one of the foamed rubbers obtained according to those processes.

BACKGROUND OF THE INVENTION

Since an ethylene-α-olefin-non-conjugated diene copolymer rubber has superior properties such as weather resistance, heat resistance and ozone resistance, it has been used as a car part such as a sealing material (for example, a weather strip). The sealing material can be produced from a foamed rubber obtained by foaming and cross-linking a rubber composition containing said copolymer rubber, a foaming agent and a cross-linking agent.

The foamed rubber used for the sealing material is required to have (1) superior compressive permanent strain, because the sealing material has to keep its high sealing property for a long period of time, (2) a high expansion ratio for achieving low cost and lightweight of the sealing material, and (3) superior surface appearance and shape retaining property from a viewpoint of designing property of the sealing material. And recently, these requirements have become greater and greater.

However, foamed rubbers known in the art do not have sufficient processability, foamability with a high expansion ratio, compressive permanent strain, surface appearance and shape retaining property.

SUMMARY OF THE INVENTION

An object of the present invention is to provide a process for producing a lightweight foamed rubber, which has superior compressive permanent strain, surface appearance and shape retaining property; and a sealing material for car use comprising the foamed rubber obtained according to said processes.

Another object of the present invention is to provide a process for producing a lightweight foamed rubber; and a sealing material for car use comprising the foamed rubber obtained according to said processes.

The present invention provides a process for producing a foamed rubber having a density of from 0.30 to 0.50 g/cm$^3$, which comprises the step of foaming and cross-linking a rubber composition containing (i) an ethylene-α-olefin-non-conjugated diene copolymer rubber satisfying the following conditions (A) to (D), (ii) a vulcanizing agent and (iii) a foaming agent;

(A) a xylene-insoluble part in the copolymer rubber is from 5 to 20% by weight, or a cyclohexane-insoluble part therein is from 5 to 30% by weight, (B) a weight ratio of an ethylene polymerization unit/an α-olefin polymerization unit in the copolymer rubber is from 73/27 to 40/60, (C) a content of a non-conjugated diene polymerization unit in the copolymer rubber is from 18 to 36 in terms of an iodine value, and (D) Mooney viscosity ($ML_{1+4}$(121° C.)) of the copolymer rubber measured according to JIS-K-6300-Mooney viscosity test is from 50 to 120 (the process being hereinafter referred to as "Process 1").

The present invention also provides a sealing material for car use, which comprises the foamed rubber obtained according to the above-mentioned Process 1.

Further, the present invention provides a process for producing a foamed rubber having a density of less than 0.50 g/cm$^3$, which comprises the step of foaming and cross-linking a rubber composition containing (i) an ethylene-α-olefin copolymer rubber, (ii) a vulcanizing agent and (iii) a foaming agent having a particle diameter of not more than 10 μm in terms of a median diameter, wherein an amount of the foaming agent exceeds 4.0 parts by weight per 100 parts by weight of the ethylene-α-olefin copolymer rubber(the process being hereinafter referred to as "Process 2").

Still further, the present invention provides a sealing material for car use, which comprises the foamed rubber obtained according to the above-mentioned Process 2.

According to the above-mentioned Process 1, a lightweight foamed rubber having superior compressive permanent strain, surface appearance and shape retaining property, can be obtained; and according to the above-mentioned Process 2, a lightweight foamed rubber can be obtained. The above-mentioned Processes 1 and 2 are called collectively "process in accordance with the present invention" in the present invention.

DETAILED DESCRIPTION OF THE INVENTION

A xylene-insoluble part contained in the ethylene-α-olefin-non-conjugated diene copolymer rubber used in the Process 1 in accordance with the present invention is from 5 to 20% by weight, and preferably from 6 to 11% by weight; and a cyclohexane-insoluble part therein is from 5 to 30% by weight, and preferably from 5 to 15% by weight. When respective insoluble parts are less than 5% by weight, an expansion ratio is so low that any lightweight foamed rubber cannot be obtained, and the obtained foamed rubber does not have superior shape retaining property. When the insoluble parts exceed 20% by weight or 30% by weight, respectively, the rubber composition used in the present invention does not have such a good kneading processability that the obtained foamed rubber does not have superior surface appearance.

A weight ratio of an ethylene polymerization unit/an α-olefin polymerization unit in the ethylene-α-olefin-non-conjugated diene copolymer rubber used in the present invention is from 73/27 to 40/60, and preferably from 67/33 to 45/55. In the present invention, "monomer polymerization unit" such as "ethylene polymerization unit" is referred hereinafter to "monomer unit". When the weight ratio of the ethylene unit exceeds 73, the obtained foamed rubber does not have superior compressive permanent strain at a low temperature, or does not have superior recovery property. When the weight ratio of the ethylene unit is lower than 27, dispersion of a reinforcing agent such as carbon black and an inorganic filler in the rubber composition used in the present invention is so insufficient that the obtained foamed rubber does not have superior surface appearance.

A content of the non-conjugated diene unit contained in the ethylene-α-olefin-non-conjugated diene copolymer rubber used in the Process 1 is from 18 to 36, and preferably from 20 to 29, in terms of an iodine value. When the iodine value is less than 18, a cross-linking density of the obtained foamed rubber is so low that the obtained foamed rubber does not have superior compressive permanent strain. Even if the iodine value exceeds 36, the obtained foamed rubber does not have any further improved compressive permanent strain.

Mooney viscosity of the ethylene-α-olefin-non-conjugated diene copolymer rubber used in the Process 1 is from 50 to 120, and preferably from 75 to 95. When the Mooney viscosity is less than 50, a gas generated by decomposition of a foaming agent used for foaming the rubber composition is hardly retained in the composition, so that any lightweight foamed rubber cannot be obtained. When the Mooney viscosity exceeds 120, the rubber composition used in the present invention does not have good kneading processability and extrusion processability.

In the present invention, the xylene-insoluble part and the cyclohexane-insoluble part are measured according to a method comprising the steps of:

(1) cutting the ethylene-α-olefin-non-conjugated diene copolymer rubber to obtain pieces, each of which has a size of nearly 1 mm square, (2) weighing about 0.5 g of the pieces with a precision of 0.1 mg, and assigning the weight to be "A" g, (3) putting the weighed pieces and 150 ml of xylene (250 ml of cyclohexane when the cyclohexane-insoluble part is measured) containing 0.1% by weight of 2,6-di-tert-buty-4-methyl phenol (antioxidant) in a 300 ml Erlenmeyer flask equipped with a ground stopper (500 ml Erlenmeyer flask equipped with a ground stopper when the cyclohexane-insoluble part is measured), (4) equipping said Erlenmeyer flask with a reflux condenser, and dipping it in a water bath at 100° C. for 6 hours to reflux (this step is not necessary when the cyclohexane-insoluble part is measured), (5) taking the Erlenmeyer flask equipped with a reflux condenser out of the water bath, and leaving it at ambient temperature for 30 minutes (when the cyclohexane-insoluble part is measured, leaving the Erlenmeyer flask of the step 3 at 25° C. for 24 hours), (6) shaking the Erlenmeyer flask for 1 hour with a shaker at a rotating speed of 120 rpm, (7) on the other hand, weighing a 120 mesh wire net with a precision of 0.1 mg, and assigning the weight to be "B" g, (8) filtering the liquid in the Erlenmeyer flask of the step 6 using said wire net, (9) adding about 20 ml of xylene (about 40 ml of cyclohexane when the cyclohexane-insoluble part is measured) to the Erlenmeyer flask, in which a trace amount of a solid remains, and further filtering the remaining solid to collect on the wire net,

(10) drying the solid-holding wire net at 60 to 90° C. for 3 hours,

(11) leaving the dried solid-holding wire net in a desiccator at ambient temperature for about 30 minutes,

(12) weighing the solid-holding wire net with a precision of 0.1 mg, and assigning the weight to be "C" g, and

(13) calculating the xylene-insoluble part or the cyclohexane-insoluble part according to the following equation:

Insoluble part (%)=100(C−B)/A.

The ethylene-α-olefin copolymer rubber used in the Process 2 in accordance with the present invention means an ethylene-α-olefin copolymer rubber or the above-mentioned ethylene-α-olefin-non-conjugated diene copolymer rubber.

Examples of the α-olefin of the ethylene-α-olefin copolymer rubber and the ethylene-α-olefin-non-conjugated diene copolymer rubber are propylene, 1-butene, 1-pentene, 1-hexene, 4-methyl-1-pentene, 1-octene and 1-decene, and a combination of two or more thereof. Of these, propylene and 1-butene are preferable.

In the present invention, the "non-conjugated diene" of said copolymer rubber means not only a non-conjugated diene but also a non-conjugated polyene such as a non-conjugated triene. Examples of such compounds are linear non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetraindene, 5-vinylnorbornene, 5-ethylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene; and 4-ethylidene-12-methyl-1,11-pentadecadiene; and a combination of two or more thereof. A preferable compound is 5-ethylidene-2-norbornene or dicyclopentadiene or a combination of both.

A process for producing the ethylene-α-olefin copolymer rubber or the ethylene-α-olefin-non-conjugated diene copolymer rubber is not particularly limited. Said copolymer rubbers can be produced by a conventional process using a conventional catalyst such as a titanium catalyst, a vanadium catalyst and a metallocene catalyst.

When the ethylene-α-olefin copolymer rubber is used in the Process 2, a molar ratio of an ethylene unit/an α-olefin unit therein is usually 1/(0.1 to 1); and when the ethylene-α-olefin-non-conjugated diene copolymer rubber is used in the Process 2, a molar ratio of an ethylene unit/a non-conjugated diene unit therein is usually 1/(0.005 to 0.2).

Mooney viscosity at 121° C. of said copolymer rubber is usually from 5 to 200, and preferably from 20 to 180. When the viscosity is less than 5, it is difficult to make a ribbon used for continuously ribbon-feeding of the rubber composition to a cold flow or a molding machine, or an extrudate of the rubber composition is deformed. When the viscosity exceeds 200, productivity of the foamed rubber may decrease.

In a process in accordance with the present invention, the ethylene-α-olefin-non-conjugated diene copolymer rubber or the ethylene-α-olefin copolymer is used in combination with a foaming agent and a vulcanizing agent (a cross-linking agent) to make a rubber composition. The ethylene-α-olefin-non-conjugated diene copolymer rubber or the ethylene-α-olefin copolymer can be used in combination with an appropriate compounding agent known in the production of a foamed rubber such as foaming coagents, plasticizers, vulcanization accelerators (cross-linking accelerators), vulcanization coagents (cross-linking auxiliaries), fillers, flame retarders, antioxidants, tackiness substances (for example, polybutene and rosin), rubber surface lubricants (for example, stearic acid), cross-linking activators (for example, polyethylene glycol), water absorbents (for example, calcium oxide) and resins (for example, polyethylene and polypropylene).

Examples of the foaming agent are sodium hydrogen carbonate, sodium carbonate, ammonium hydrogen carbonate, ammonium carbonate, ammonium nitrite, N,N'-dimethyl-N,N'-dinitroso-telephthalamide, N,N'-dinitroso-pentamethylene-tetramine, azodicarbonamide, azobisisobutyronitrile, azocyclohexylnitrile, azodiaminobenzene, barium azodicarboxylate, benzenesulfonyl hydrazide, toluenesulfonyl hydrazide, toluenesulfonyl hydrazide derivatives, p-toluenesulfonyl semicarbazide, 4,4'-oxybis(benzenesulfonyl hydrazide), diphenylsulfone-3,3'-disulfonyl hydrazide, calcium azide, 4,4'-diphenyl-disulfonyl azide, p-toluenesulfonyl azide, p-toluenesulfonyl acetonehydrazone and hydrazodicarbonamide, and a combination of two or more thereof. Of these, a foaming agent having a particle diameter of not more than 10 μm, preferably not more than 5 μm in terms of a median diameter is preferable from a viewpoint of increasing an expansion ratio.

A preferable amount of the foaming agent used in the Process 1 is from 0.5 to 20 parts by weight per 100 parts by weight of the ethylene-α-olefin-non-conjugated diene copolymer rubber. When the amount is less than 0.5 part by weight, an expansion ratio of the obtained foamed rubber may be lowered. When the amount exceeds 20 parts by weight, the obtained foamed rubber may not have superior surface appearance.

An amount of the foaming agent used in the Process 2 exceeds 4.0 parts by weight per 100 parts by weight of the ethylene-α-olefin copolymer, and preferably not less than 5 parts by weight from a viewpoint of obtaining a high expansion ratio. It is recommendable to use 4,4'-oxybis (benzenesulfonyl hydrazide) as the foaming agent.

The foaming agent may be used in combination with foaming coagents. Examples of the foaming coagents are urea compounds; zinc oxide; inorganic salts such as tribasic lead sulfate; metal soap such as zinc stearate and lead stearate; and salicylic acid.

Examples of the plasticizers are process oil, lubricating oil, paraffin, fluidized paraffin, petroleum asphalt, vaseline, coal tar pitch, castor oil, linseed oil, factice, beeswax, ricinolicacid, palmitic acid, barium stearate, calcium stearate, zinc laurate, atactic polypropylene and cumaron indene resins. Of these, process oil is particularly preferable. An amount of the plasticizers used is usually from 10 to 150 parts by weight, preferably from 30 to 150 parts by weight, and more preferably from 50 to 150 parts by weight, per 100 parts by weight of the ethylene-α-olefin-non-conjugated diene copolymer rubber or the ethylene-α-olefin copolymer rubber.

Preferable examples of the vulcanizing agent are sulfur; sulfur chloride; sulfur dichloride; 4,4'-dithiodimorpholine; morpholine disulfide; alkylphenol disulfide; tetramethylthiuram disulfide; selenium dimethyldithiocarbamate; and organic peroxides such as dicumyl peroxide, 2,5-dimethyl-2,5-di(t-butylperoxy)hexane, 2,5-dimethyl-2,5-di (benzoylperoxy)hexane, 2,5-dimethyl-2,5-(t-butylperoxy) hexyne-3, di-t-butylperoxide, di-t-butylperoxide-3,3,5-trimethylcyclohexane and t-butylhydroperoxide. Of these, preferred are sulfur, dicumyl peroxide, di-t-butylperoxide and t-butylperoxide-3,3,5-trimethylcyclohexane.

Sulfur is used in an amount of usually from 0.1 to 10 parts by weight, and preferably from 0.5 to 5 parts by weight, per 100 parts by weight of the ethylene-α-olefin-non-conjugated diene copolymer rubber or the ethylene-α-olefin copolymer rubber. The organic peroxide is used in an amount of usually from 0.1 to 15 parts by weight, and preferably from 0.5 to 8 parts by weight, per 100 parts by weight of said copolymer rubber.

The above-mentioned sulfur or sulfur-containing compound may be used in combination with a vulcanization accelerator or a vulcanization coagent. Examples of the vulcanization accelerator are N-cyclohexyl-2-benzothiazole-sufenamide, N-oxydiethylene-2-benzothiazole-sulfenamide, N,N-diisopropyl-2-benzothiazole-sulfenamide, 2-mercaptobenzothiazole, 2-(2, 4-dinitrophenyl)mercaptobenzothiazole, 2-(2,6-diethyl-4-morpholinothio)benzothiazole, dibenzothiazyl-disulfide, diphenylguanidine, triphenylguanidine, di-o-tolylguanidine, o-tolyl-bi-guanide, diphenylguanidine-phthalate, an acetaldehyde-aniline reaction product, a butylaldehyde-aniline condensate, hexamethylenetetramine, acetaldehyde ammonia, 2-mercaptoimidazoline, thiocarbaniride, diethylthiourea, dibutylthiourea, trimethylthiourea, di-o-tolylthiourea, tetramethylthiuram monosulfide, terametylthiuram disulfide, teraethylthiuram disulfide, terabutylthiuram disulfide, dipentamethylenethiuram tetrasulfide, zinc dimethyldithiocarbamate, zinc diethylthiocarbamate, zinc di-n-butylthiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthate and ethylenethiourea. The vulcanization accelerator is used in an amount of from 0.1 to 20 parts by weight, and preferably from 0.2 to 10 parts by weight, per 100 parts by weight of the ethylene-α-olefin-non-conjugated diene copolymer rubber or the ethylene-α-olefin copolymer rubber.

Examples of the vulcanization coagent are metal oxides such as magnesium oxide and zinc oxide. Of these, preferred is zinc oxide. The vulcanization coagent is used usually in an amount of from 3 to 20 parts by weight per 100 parts by weight of the ethylene-α-olefin-non-conjugated diene copolymer rubber or the ethylene-α-olefin copolymer rubber.

The peroxide may be used in combination with cross-linking coagents such as sulfur, quinonedioxime compounds (for example, p-quinonedioxime), polyethylene glycol dimethacrylate, diallyl phthalate, triallyl cyanurate and divinylbenzene.

Preferable examples of the fillers are carbon black usually used in the field of rubber such as SRF (N770), GPF (N660), FEF (N550), HAF (N330), ISAF (N220), SAF (N110), ET (N880) and MT (N990); and inorganic fillers such as fine grain silicic acid, calcium carbonate, talc and clay. An amount of the fillers used is preferably from 30 to 300 parts by weight, and more preferably from 70 to 200 parts by weight, per 100 parts by weight of the ethylene-α-olefin-non-conjugated diene copolymer rubber or the ethylene-α-olefin copolymer rubber.

A density of the foamed rubber obtained according to the Process 1 is from 0.30 to 0.50 g/cm$^3$, and preferably from 0.34 to 0.42 g/cm$^3$. When the density is less than 0.30 g/cm$^3$, any foamed rubber having good compressive permanent strain cannot be obtained. When the density exceeds 0.50 g/cm$^3$, a lightweight foamed rubber cannot be obtained.

A density of the foamed rubber obtained according to the Process 2 is less than 0.50 g/cm$^3$. When the density is not less than 0.50 g/cm$^3$, any foamed rubber having a high expansion ratio (in other words, any lightweight foamed rubber) cannot be obtained.

The rubber composition used in the present invention can be obtained by kneading respective components to make the same using both Banbury mixer and a roll, or using both a kneader and a roll. Said rubber composition has superior processability.

It is possible to produce a lightweight foamed rubber, which has superior compressive permanent strain, surface appearance and shape retaining property, by foaming and cross-linking said rubber composition using an apparatus such as an oven, a continuous hot air cross-linking apparatus, a microwave heating apparatus, a glass beads fluidized bed, a molten salt vessel and a hot mold. The obtained foamed rubber is most suitable as a sealing material for car use.

EXAMPLE

The present invention is explained with reference to the following Examples, but the present invention is not limited thereto. The following Examples 1 to 7 and Comparative Examples 1 to 3 relate to the Process 1; and Examples 8 and 9 and Comparative Examples 4 to 9 relate to the Process 2.

Examples 1 to 7 and Comparative Examples 1 to 3

An ethylene-propylene-5-ethylidene-2-norbornene copolymer rubber as shown in Table 1 (described as "Copolymer rubber" in Table 1) was used as the ethylene-α-olefin-non-conjugated diene copolymer rubber.

Carbon black, a commercial name of Asahi 50HG, manufactured by ASAHI CARBON Co., Ltd., was used.

Process oil, a commercial name of PS 430, manufactured by Idemitsu Kosan Co., Ltd., was used.

4,4'-Oxybis(benzenesulfonyl hydrazide) having a particle diameter of 13 μm in terms of a median diameter (described as "Y" in Table 1), or 4,4'-oxybis(benzenesulfonyl hydrazide) having a particle diameter of 4 μm in terms of a median diameter (described as "Z", in Table 1) was used as the foaming agent.

A mixture comprising 32% by weight of M(MBT), 32% by weight of BZ(ZnBDC), 2% by weight of TE(TeEDC), 21% by weight of PZ(ZnMDC) and 13% by weight of morpholine disulfide was used as the cross-linking accelerator (vulcanization accelerator).

Table 2 summarizes components used and their blending ratio (parts by weight).

In Table 1, the mark "○" shows "good", the mark "Δ" shows "somewhat good", and the mark "X" shows "bad".

The copolymer rubber, carbon black, calcium carbonate, process oil, zinc oxide and stearic acid as shown in Table 2 were blended using a 1.5-liter Banbury mixer to obtain a blended mixture.

The blended mixture was mixed with calcium oxide, the foaming agent, sulfur and the cross-linking accelerator (vulcanization accelerator) as shown in Table 2 using an 8 inch open roll to obtain a rubber composition.

The rubber composition was extruded using a 45 mm extruder mounted with tube like dies (inner diameter=10 mm, thickness=1.0 mm) at dies temperature of 80° C. and cylinder temperature of 60° C. to obtain a tube like molded product. An outside smoothness of the molded product was visually evaluated (described as "Appearance of extrudate" in Table 1).

The molded product was heated at 230° C. for 4 minutes in a hot air vulcanization vessel to obtain a tube like foamed rubber. An outside smoothness of the foamed rubber was visually evaluated (described as "Surface appearance" in Table 1). A degree of collapse of the foamed rubber was visually evaluated (described as "Shape retaining property" in Table 1).

A density of the foamed rubber was found according to an equation, density=weight/volume (described as "Density" in Table 1). In the equation, "weight" means a weight in air of a cut specimen of the foamed rubber (length=50 mm), and "volume" means a volume derived from buoyancy when the foamed rubber is sunk in water.

Compressive permanent strain of the above-mentioned tube like foamed rubber was measured by a method comprising the steps of:

(1) compressing a cut specimen of the foamed rubber (length=20 mm) to 50% of a tube outer diameter using a sponge compressive permanent strain measuring mold, (2) heating the compressed specimen at 70° C. for 96 hours in a gear oven, and (3) measuring the strain thereof according to a foamed rubber physical test method (SRIS-0101) (described as "Compressive permanent strain" in Table 1).

The above Examples 1 to 7 and Comparative Examples 1 to 3 demonstrate as follows.

1. The foamed rubbers obtained in Examples 1 to 7 had low density and superior surface appearance, shape retaining property and compressive permanent strain.

2. The foamed rubbers obtained in Comparative Examples 1 and 2, wherein either of a xylene-insoluble part or a cyclohexane-insoluble part was less than 5% by weight, had superior surface appearance, but did not have low density and superior shape retaining property.

3. The foamed rubber obtained in Comparative Example 3, wherein Mooney viscosity was less than 50, had superior appearance of extrudate, but did not have low density, superior surface appearance and superior compressive permanent strain.

Examples 8 and 9 and Comparative Examples 4 to 9

An ethylene-propylene-5-ethylidene-2-norbornene-dicyclopentadiene copolymer rubber (described as "Copolymer rubber" in Table 3) was used as the ethylene-α-olefin-non-conjugated diene copolymer rubber.

As carbon black, process oil, a cross-linking accelerator (vulcanization accelerator) and a foaming agent, the same ones as those used in Examples 1 to 7 were used.

Table 4 summarizes the components used and their blending ratio (parts by weight).

The copolymer rubber, carbon black, aluminum silicate, process oil, zinc oxide and stearic acid as shown in Table 4 were blended using 1.5-liter Banbury mixer to obtain a blended mixture.

The blended mixture was mixed with calcium oxide, the foaming agent, sulfur and the cross-linking accelerator (vulcanization accelerator) as shown in Table 4 using an 8 inch open roll to obtain a rubber composition.

The rubber composition was extruded using a 45 mm extruder mounted with tube like dies (inner diameter=10 mm, thickness=1.2 mm) at dies temperature of 80° C. and cylinder temperature of 60° C. to obtain a tube like molded product.

The molded product was heated at 220° C. for 10 minutes in a hot air vulcanization vessel to obtain a tube like foamed rubber. A density of the foamed rubber was measured by the same method as that mentioned in Example 1, and the results are shown in Table 3.

The above Examples 8 and 9 and Comparative Examples 4 to 9 demonstrate as follows.

1. The famed rubbers obtained in Examples 8 and 9, wherein the foaming agent "Z" having a particle diameter of not more than 10 μm in terms of a median diameter was used in an amount exceeding 4.0 parts by weight, had a density of less than 0.50 g/cm$^3$.

2. The foamed rubbers obtained in Comparative Examples 6 and 7, wherein the foaming agent "Y" having a particle diameter exceeding 10 μm in terms of a median diameter was used, had a density of not less than 0.50 g/cm$^3$. These results should be compared with Examples 8 and 9, wherein the foaming agent was used in the same amount as those in Comparative Examples 6 and 7, respectively.

3. The foamed rubbers obtained in Comparative Examples 4 and 5, wherein the foaming agent "Z" was used, but the used amount thereof did not exceed 4.0 parts by weight, had a density of not less than 0.50 g/Cm$^3$. Said densities were almost the same as those obtained in Comparative Examples 8 and 9, wherein the foaming agent "Y" was used in the same amount as those in Comparative Examples 4 and 5, respectively, because the amount of the foaming agent "Z" used in Comparative Examples 4 and 5 did not exceed 4.0 parts by weight.

TABLE 1

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Copolymer rubber | | | | | | | | | | |
| Xylene-insoluble part (% by weight) | 7.6 | 8.5 | 9.7 | 11.0 | 12.9 | 18.4 | 7.6 | 4.0 | 1.0 | 6.0 |
| Cyclohexane-insoluble part (% by weight) | 8.4 | 11.1 | 13.9 | 15.6 | 19.8 | 26.3 | 8.4 | 4.2 | 2.1 | 7.2 |
| Ethylene unit/propylene unit (by weight) | 60/40 | 60/40 | 60/40 | 60/40 | 60/40 | 60/40 | 60/40 | 60/40 | 60/40 | 60/40 |
| Iodine value | 21 | 21 | 21 | 21 | 21 | 21 | 21 | 21 | 21 | 21 |
| Mooney viscosity | 82 | 86 | 90 | 95 | 109 | 108 | 82 | 103 | 92 | 45 |
| Foaming agent used | Y | Y | Y | Y | Y | Y | Z | Y | Y | Y |
| Appearance of extrudate | ◯ | ◯ | ◯ | ◯ | Δ | Δ | ◯ | ◯ | ◯ | ◯ |
| Density (g/cm$^3$) | 0.39 | 0.38 | 0.39 | 0.40 | 0.42 | 0.40 | 0.36 | 0.47 | 0.53 | 0.48 |
| Compressive permanent strain (%) | 24 | 27 | 28 | 28 | 30 | 31 | 27 | 27 | 27 | 35 |
| Surface appearance | ◯ | ◯ | ◯ | ◯ | Δ | Δ | ◯ | ◯ | ◯ | X |
| Shape retaining property | ◯ | ◯ | ◯ | ◯ | ◯ | ◯ | ◯ | X | X | Δ |

TABLE 2

| Component | Blending ratio (parts by weight) |
| --- | --- |
| Copolymer rubber | 100 |
| Carbon black | 100 |
| Calcium carbonate | 50 |
| Process oil | 65 |
| Zinc oxide | 7 |
| Stearic acid | 1 |
| Calcium oxide | 2 |
| Foaming agent | 6.0 |
| Sulfur | 1.5 |
| Vulcanization accelerator | 4.7 |

TABLE 4

| Component | Blending ratio (parts by weight) |
| --- | --- |
| Copolymer rubber | 100 |
| Carbon black | 100 |
| Aluminum silicate (clay) | 30 |
| Process oil | 55 |
| Zinc oxide | 7 |
| Stearic acid | 1 |
| Calcium oxide | 5 |
| Foaming agent | 3.5~6.0 |
| Sulfur | 1.5 |
| Vulcanization accelerator | 4.7 |

TABLE 3

|  | Example | | Comparative Example | | | | | |
| --- | --- | --- | --- | --- | --- | --- | --- | --- |
|  | 8 | 9 | 4 | 5 | 6 | 7 | 8 | 9 |
| Copolymer rubber | | | | | | | | |
| Xylene-insoluble part (% by weight) | 0.5 | 0.5 | 0.5 | 0.5 | 0.5 | 0.5 | 0.5 | 0.5 |
| Cyclohexane-insoluble part (% by weight) | 3.5 | 3.5 | 3.5 | 3.5 | 3.5 | 3.5 | 3.5 | 3.5 |
| Ethylene unit/propylene unit (by mole) | 1.0/0.44 | 1.0/0.44 | 1.0/0.44 | 1.0/0.44 | 1.0/0.44 | 1.0/0.44 | 1.0/0.44 | 1.0/0.44 |
| Ethylene unit/non-conjugated diene unit (by mole) | 1.0/0.051 | 1.0/0.051 | 1.0/0.051 | 1.0/0.051 | 1.0/0.051 | 1.0/0.051 | 1.0/0.051 | 1.0/0.051 |
| Mooney viscosity | 80 | 80 | 80 | 80 | 80 | 80 | 80 | 80 |
| Foaming agent used | | | | | | | | |
| Kind | Z | Z | Z | Z | Y | Y | Y | Y |
| Amount (parts by weight / 100 parts by weight of copolymer rubber) | 6.0 | 5.0 | 4.0 | 3.5 | 6.0 | 5.0 | 4.0 | 3.5 |
| Density (g/cm$^3$) | 0.43 | 0.48 | 0.62 | 0.70 | 0.50 | 0.53 | 0.64 | 0.70 |

What is claimed is:

1. A process for producing a foamed rubber having a density of from 0.30 to 0.50 g/cm$^3$, which comprises the step of foaming and cross-linking a rubber composition containing (i) an ethylene-α-olefin-non-conjugated diene copolymer rubber satisfying the following conditions (A) to (D), (ii) a vulcanizing agent and (iii) a foaming agent;

(A) a xylene-insoluble part in the copolymer rubber is from 5 to 20% by weight, or a cyclohexane-insoluble part therein is from 5 to 30% by weight, (B) a weight ratio of an ethylene polymerization unit/an α-olefin polymerization unit in the copolymer rubber is from 73/27 to 40/60, (C) a content of a non-conjugated diene polymerization unit in the copolymer rubber is from 18 to 36 in terms of an iodine value, and (D) Mooney viscosity ($ML_{1+4}(121°$ C.$)$) of the copolymer rubber measured according to JIS-K-6300-Mooney viscosity test is from 50 to 120.

2. The process for producing a foamed rubber according to claim 1, wherein the xylene-insoluble part in the ethylene-α-olefin-non-conjugated diene copolymer rubber is from 6 to 11% by weight, and the Mooney viscosity ($ML_{1+4}(121°$ C.$)$) thereof measured according to JIS-K-6300-Mooney viscosity test is from 75 to 95.

3. The process for producing a foamed rubber according to claim 1, wherein the cyclohexane-insoluble part in the ethylene-α-olefin-non-conjugated diene copolymer rubber is from 5 to 15% by weight, and the Mooney viscosity ($ML_{1+4}$(121° C.)) thereof measured according to JIS-K-6300-Mooney viscosity test is from 60 to 95.

4. The process for producing a foamed rubber according to claim 1, wherein the density of the foamed rubber is from 0.34 to 0.42 $g/cm^3$.

5. The process for producing a foamed rubber according to claim 1, wherein the α-olefin in the ethylene-α-olefin-non-conjugated diene copolymer rubber contains propylene.

6. The process for producing a foamed rubber according to claim 1, wherein the foaming agent has a particle diameter of not more than 10 μm in terms of a median diameter.

7. The process for producing a foamed rubber according to claim 1, wherein the non-conjugated diene in the ethylene-α-olefin-non-conjugated diene copolymer rubber contains 5-ethylidene-2-norbornene, dicyclopentadiene or a combination thereof.

8. A sealing material for car use, which comprises the foamed rubber obtained by the process for producing a foamed rubber according to claim 1.

9. A process for producing a foamed rubber having a density of less than 0.50 $g/cm^3$, which comprises the step of foaming and cross-linking a rubber composition containing (i) an ethylene-α-olefin copolymer rubber, (ii) a vulcanizing agent and (iii) a foaming agent having a particle diameter of not more than 10 μm in terms of a median diameter, wherein an amount of the foaming agent exceeds 4.0 parts by weight per 100 parts by weight of the ethylene-α-olefin copolymer rubber.

10. The process for producing a foamed rubber according to claim 9, wherein the foaming agent has a particle diameter of not more than 5 μm in terms of a median diameter.

11. The process for producing a foamed rubber according to claim 9, wherein the foaming agent contains 4,4'-oxybis(benzenesulfonyl hydrazide).

12. The process for producing a foamed rubber according to claim 9, wherein the ethylene-α-olefin copolymer rubber contains an ethylene-α-olefin copolymer rubber or an ethylene-α-olefin-non-conjugated diene copolymer rubber.

13. The process for producing a foamed rubber according to claim 9, wherein the α-olefin in the ethylene-α-olefin copolymer rubber contains propylene.

14. The process for producing a foamed rubber according to claim 9, wherein the non-conjugated diene in the ethylene-α-olefin copolymer rubber contains 5-ethylidene-2-norbornene, dicyclopentadiene or a combination thereof.

15. A sealing material for car use, which comprises the foamed rubber obtained by the process for producing a foamed rubber according to claim 9.

* * * * *